(12) United States Patent
Zhou et al.

(10) Patent No.: US 10,855,414 B2
(45) Date of Patent: Dec. 1, 2020

(54) CROSS-SUBBAND OR CROSS-CARRIER SCHEDULING METHOD, BASE STATION AND USER EQUIPMENT

(71) Applicant: SPREADTRUM COMMUNICATIONS (SHANGHAI) CO., LTD., Shanghai (CN)

(72) Inventors: Huayu Zhou, Shanghai (CN); Yanan Jia, Shanghai (CN); Weijie Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 114 days.

(21) Appl. No.: 15/651,734

(22) Filed: Jul. 17, 2017

(65) Prior Publication Data

US 2018/0131482 A1 May 10, 2018

(30) Foreign Application Priority Data

Nov. 4, 2016 (CN) .......................... 2016 1 0972448

(51) Int. Cl.
*H04L 5/00* (2006.01)
*H04L 27/26* (2006.01)
*H04W 72/12* (2009.01)

(52) U.S. Cl.
CPC .......... *H04L 5/0012* (2013.01); *H04L 5/0053* (2013.01); *H04L 5/0091* (2013.01);
(Continued)

(58) Field of Classification Search
CPC . H04L 5/0012; H04L 27/262; H04L 27/2662; H04L 27/2601; H04L 5/001;
(Continued)

(56) References Cited

U.S. PATENT DOCUMENTS 7,860,150 B2 * 12/2010 Tiirola ................ H04B 1/7143
370/491
2007/0091837 A1 * 4/2007 Li .......................... H04W 72/14
370/328
(Continued)

FOREIGN PATENT DOCUMENTS

CN 102714562 A 10/2012
EP 2892296 A1 * 7/2015 .......... H04W 72/085

OTHER PUBLICATIONS

"Discussion on support of CA operation in NR," LG Electronics; Oct. 14, 2016, 3GPP TSG RAN WG1 Meeting #86bis; 3 pages.
(Continued)

*Primary Examiner* — Jamaal Henson
(74) *Attorney, Agent, or Firm* — Cantor Colburn LLP

(57) ABSTRACT

A cross-subband or cross-carrier scheduling method, a base station and a user equipment are provided. The method includes: determining a first start symbol and a first end symbol for scheduling a user equipment to transmit and receive data using a time-frequency resource on a second subband or carrier, based on two numerologies corresponding to two subbands or carriers; and transmitting downlink control information to the user equipment on the first subband or carrier, so that the user equipment can transmit and receive data using the time-frequency resource on the second subband or carrier according to the downlink control information, where the downlink control information includes an identification number of the second subband or carrier allocated for the user equipment and the first start symbol and the first end symbol for scheduling the user equipment to transmit and receive data using the time-frequency resource on the second subband or carrier.

18 Claims, 8 Drawing Sheets

The base station determines a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier ~S11

The base station transmits downlink control information to the user equipment on the first subband or the first carrier, so that the user equipment can transmit and receive data using the time-frequency resource on the second subband or the second carrier according to the downlink control information, where the downlink control information includes an identification number of the second subband or the second carrier allocated for the user equipment and the first start symbol and the first end symbol for scheduling the user equipment to transmit and receive data using the time-frequency resource on the second subband or a second carrier ~S12

(52) U.S. Cl.
CPC ........ *H04L 27/262* (2013.01); *H04L 27/2602* (2013.01); *H04L 27/2662* (2013.01); *H04L 27/2666* (2013.01); *H04W 72/1215* (2013.01); *H04L 5/0007* (2013.01)

(58) Field of Classification Search
CPC ... H04L 5/0039; H04L 5/0053; H04L 5/0094; H04L 5/0007; H04W 72/121; H04W 72/1215; H04W 72/1257; H04W 72/1289; H04W 72/042
See application file for complete search history.

(56) References Cited

U.S. PATENT DOCUMENTS

| | | | | |
|---|---|---|---|---|
| 2007/0280166 | A1* | 12/2007 | Jung | H04B 1/713 370/331 |
| 2011/0081913 | A1* | 4/2011 | Lee | H04L 5/003 455/450 |
| 2011/0110227 | A1* | 5/2011 | Yang | H04W 72/085 370/228 |
| 2012/0045014 | A1* | 2/2012 | Damnjanovic | H04L 5/001 375/295 |
| 2012/0120924 | A1* | 5/2012 | Montojo | H04W 72/14 370/336 |
| 2012/0263127 | A1 | 10/2012 | Moon et al. | |
| 2013/0010720 | A1* | 1/2013 | Lohr | H04W 72/0453 370/329 |
| 2013/0195070 | A1* | 8/2013 | Bashar | H04W 4/70 370/330 |
| 2014/0206362 | A1* | 7/2014 | Xu | H04W 36/04 455/444 |
| 2014/0301301 | A1* | 10/2014 | Cheng | H04L 5/0048 370/329 |
| 2015/0208392 | A1* | 7/2015 | Park | H04B 7/024 370/329 |
| 2015/0305058 | A1* | 10/2015 | Hammarwall | H04J 1/00 370/280 |
| 2015/0334744 | A1* | 11/2015 | Ji | H04W 74/0816 370/336 |
| 2015/0341957 | A1* | 11/2015 | Tang | H04W 72/1289 370/329 |
| 2016/0182187 | A1* | 6/2016 | Kim | H04L 1/1861 714/807 |
| 2016/0294498 | A1* | 10/2016 | Ma | H04L 5/001 |
| 2017/0367046 | A1* | 12/2017 | Papasakellariou | H04L 5/0053 |
| 2018/0262900 | A1* | 9/2018 | Moon | H04W 8/005 |

OTHER PUBLICATIONS

"On Downlink Control Channel Design for New Radio," Convida Wireless; Oct. 14, 2016, 3GPP TSG RAN WG1 Meeting #86bis; 5 pages.
Huawei, HiSilicon, "On multiple carrier operation," Oct. 14, 2016, 3GPP TSG RAN WG1 Meeting #86bis; 4 pages.
SIPO First Office Action corresponding to Application No. 201610972448.9; dated Apr. 25, 2018.

* cited by examiner

The base station determines a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier ~S11

The base station transmits downlink control information to the user equipment on the first subband or the first carrier, so that the user equipment can transmit and receive data using the time-frequency resource on the second subband or the second carrier according to the downlink control information, where the downlink control information includes an identification number of the second subband or the second carrier allocated for the user equipment and the first start symbol and the first end symbol for scheduling the user equipment to transmit and receive data using the time-frequency resource on the second subband or a second carrier ~S12

FIG. 1

CROSS-SUBBAND OR CROSS-CARRIER SCHEDULING METHOD, BASE STATION AND USER EQUIPMENT

CROSS-REFERENCE TO RELATED APPLICATIONS

The present invention claims priority under 35 U.S.C. § 119 to Chinese Patent Application No. 201610972448.9 filed in China on Nov. 4, 2016, the entire content of which is incorporated herein by reference.

TECHNICAL FIELD

The present disclosure relates to wireless communication technology field, and more particularly, to a cross-subband or cross-carrier scheduling method, a base station and a user equipment.

BACKGROUND

With development of mobile communication technology, the Fifth Generation (5G) New Radio (NR) communication system has been put on an agenda. Different from a Long Term Evolution (LTE) system, in the NR system, a single carrier has a maximum bandwidth of at least 80 MHz, which is much larger than a maximum bandwidth of 20 MHz of a single carrier in the LTE system. An increase in the bandwidth of the single carrier will bring about a downlink control channel design problem.

In the LTE system, the downlink control channel occupies a whole bandwidth. If it is the same in the NR system, the user equipment will need to detect a downlink control channel on a larger bandwidth, which may result in an increase in power consumption of a user equipment. Therefore, in the NR system, a downlink control channel based on a subband is introduced, that is, the user equipment may detect only a downlink control channel on a subband. However, there may be multiple subbands on a carrier, the user equipment should be able to use data channels on any subband of the carrier, therefore the downlink control channel is required to support a cross-subband scheduling. Meanwhile, in order to achieve a peak rate, the user equipment may need to aggregate resources on the multiple carriers, therefore the NR system is also required to have a carrier aggregation function on the multiple carrier. Correspondingly, in order to save a downlink control channel overhead, the downlink control channel also needs to support a cross-carrier scheduling, so that the user equipment can obtain scheduling information on the multiple carriers by detecting a downlink control channel on a carrier. In conclusion, the downlink control channel need to support a cross-subband scheduling and a cross-carrier scheduling.

At present, there is no cross-subband or cross-carrier scheduling method in the NR system.

SUMMARY

A cross-subband or cross-carrier scheduling method, a base station and a user equipment are provided in the present disclosure, which can realize a cross-subband or cross-carrier scheduling in an NR system.

In one aspect, a cross-subband or cross-carrier scheduling method is provided according to an embodiment of the present disclosure. The cross-subband or cross-carrier scheduling method includes: determining a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier; and transmitting downlink control information to the user equipment on the first subband or the first carrier, so that the user equipment can transmit and receive data using the time-frequency resource on the second subband or the second carrier according to the downlink control information, where the downlink control information includes an identification number of the second subband or the second carrier allocated for the user equipment and the first start symbol and the first end symbol for scheduling the user equipment to transmit and receive data using the time-frequency resource on the second subband or the second carrier.

Optionally, determining the first start symbol for scheduling the user equipment to transmit and receive data using the time-frequency resource on the second subband or the second carrier, based on the first numerology corresponding to the first subband or the first carrier and the second numerology corresponding to the second subband or the second carrier includes: determining a symbol of the second numerology closest to a second end symbol of a downlink control channel of the first numerology as the first start symbol, or determining a second start symbol of a $k1^{th}$ reference slot of the second numerology after the second end symbol of the downlink control channel of the first numerology as the first start symbol, where k1 is an integer greater than or equal to 1, and identified by the downlink control information.

Optionally, determining the first end symbol for scheduling the user equipment to transmit and receive data using the time-frequency resource on the second subband or the second carrier, based on the first numerology corresponding to the first subband or the first carrier and the second numerology corresponding to the second subband or the second carrier includes: determining a third end symbol of a slot where the first start symbol is located as the first end symbol, or determining a fourth end symbol of a $k2^{th}$ reference slot after the slot where the first start symbol is located as the first end symbol, where k2 is an integer greater than or equal to 1, and identified by the downlink control information.

Optionally, the reference slot is a slot defined by the first numerology corresponding to the first subband or the first carrier, or a slot defined by the second numerology corresponding to the second subband or the second carrier.

Optionally, the downlink control information further includes a scheduling indication for indicating the user equipment to detect scheduling information after a predetermined time.

In another aspect, a cross-subband or cross-carrier scheduling method is provided according to another embodiment of the present disclosure. The cross-subband or cross-carrier scheduling method includes: receiving downlink control information transmitted by a base station on a first subband or a first carrier, where the downlink control information includes an identification number of a second subband or a second carrier allocated for a user equipment and a first start symbol and a first end symbol for scheduling the user equipment to transmit and receive data using a time-frequency resource on the second subband or the second carrier; and transmitting or receiving data using the time-frequency resource on the second subband or the second carrier based on the downlink control information.

Optionally, transmitting or receiving data using the time-frequency resource on the second subband or the second carrier based on the downlink control information includes: transmitting and receiving data using the time-frequency resource on the second subband or the second carrier based on the start symbol and the end symbol.

Optionally, the downlink control information includes a scheduling indication for indicating the user equipment to detect scheduling information after a predetermined time.

In another aspect, a base station is provided according to embodiments of the present disclosure. The base station includes: a determining circuitry, configured to determine a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier; and a transmitting circuitry, configured to transmit downlink control information to the user equipment on the first subband or the first carrier, so that the user equipment can transmit and receive data using the time-frequency resource on the second subband or the second carrier according to the downlink control information, where the downlink control information includes an identification number of the second subband or the second carrier allocated for the user equipment and the start symbol and the first end symbol determined by the determining circuitry for scheduling the user equipment to transmit and receive data using the time-frequency resource on the second subband or the second carrier.

Optionally, the determining circuitry includes: a first determining circuitry, configured to determine a symbol of the second numerology closest to a second end symbol of a downlink control channel of the first numerology as the start symbol, or determine a second start symbol of a $k1^{th}$ reference slot of the second numerology after the second end symbol of the downlink control channel of the first numerology as the first start symbol, where k1 is an integer greater than or equal to 1, and identified by the downlink control information.

Optionally, the determining circuitry further includes: a second determining circuitry, configured to determine a third end symbol of a slot where the first start symbol is located as the first end symbol, or determine a fourth end symbol of a $k2^{th}$ reference slot after the slot where the first start symbol is located as the first end symbol, where k2 is an integer greater than or equal to 1, and identified by the downlink control information.

Optionally, the reference slot is a slot defined by the first numerology corresponding to the first subband or the first carrier, or a slot defined by the second numerology corresponding to the second subband or the second carrier.

Optionally, the downlink control information further includes a scheduling indication for indicating the user equipment to detect scheduling information after a predetermined time.

In another aspect, a user equipment is provided according to embodiments of the present disclosure. The user equipment includes: a receiving circuitry, configured to receive downlink control information transmitted by a base station on a first subband or a first carrier, where the downlink control information includes an identification number of a second subband or a second carrier allocated for a user equipment and a first start symbol and a first end symbol for scheduling the user equipment to transmit and receive data using a time-frequency resource on the second subband or the second carrier; and a data transceiving circuitry, configured to transmit or receive data using the time-frequency resource on the second subband or the second carrier based on the downlink control information received by the receiving circuitry.

Optionally, the data transceiving circuitry is configured to transmit or receive data using the time-frequency resource on the second subband or the second carrier based on the first start symbol and the first end symbol.

Optionally, the downlink control information includes a scheduling indication for indicating the user equipment to detect scheduling information after a predetermined time.

Compared with the conventional technology, the present disclosure has the following advantages.

According to the cross-subband or cross-carrier scheduling method, the base station and the user equipment provided in the present disclosure, the base station is configured to determine the first start symbol and the first end symbol for scheduling the user equipment to transmit and receive data using the time-frequency resource on the second subband or the second carrier, based on the first numerology corresponding to the first subband or the first carrier and the second numerology corresponding to the second subband or the second carrier, and transmit the first start symbol and the first end symbol to the user equipment on the first subband or the first carrier through the downlink control information, then the user equipment is configured to transmit or receive data using the time-frequency resource on the second subband or the second carrier based on the first start symbol and the first end symbol, so that the cross-subband or cross-carrier scheduling can be realized in the NR system.

BRIEF DESCRIPTION OF THE DRAWINGS

FIG. 1 schematically illustrates a flow chart of a cross-subband or cross-carrier scheduling method at a base station side according to an embodiment of the present disclosure;

DETAILED DESCRIPTION

Figure 2A:
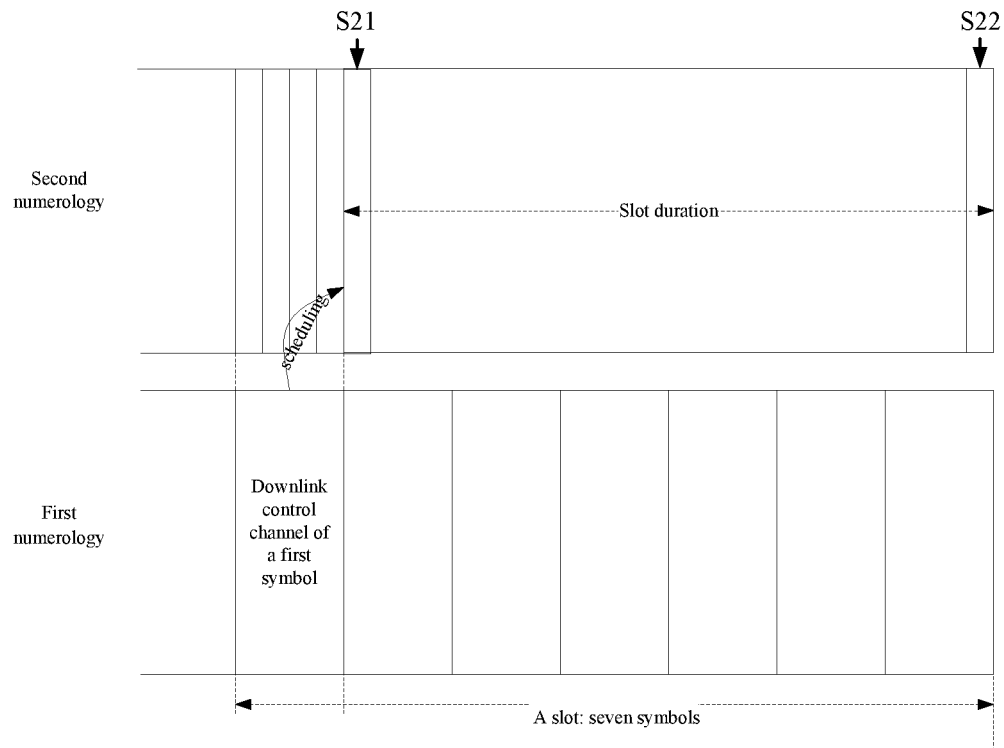
FIG. 2A and FIG. 2B schematically illustrate a method for determining a first start symbol and a first end symbol according to an embodiment of the present disclosure.

The foregoing and other objects, features and advantages of the present disclosure will become more apparent from the following detailed description of the preferred embodiments of the present disclosure when taken in conjunction with the accompanying drawings. Apparently, the embodiments described below are merely a part of the present invention, and not all embodiments. All other embodiments obtained by those of ordinary skill in the art based on embodiments in the present disclosure without making creative work are within the scope of the present disclosure.

In a cross-subband or cross-carrier scheduling in an NR system, before a user equipment is scheduled by a base station from a subband or carrier to other subbands or carriers to transimit and receive data using a time frequency resource of the other subbands or carriers, the other subbands or carriers are active for the user equipment. A subband or carrier being active, means that the user equipment has been synchronized to the subband or carrier and performed an Radio Resource Management (RRM) measurement on the subband or carrier. In general, the user equipment may also be configured to perform a Channel State Information (CSI) measurement on the subband or carrier. The cross-carrier scheduling requires an addition of a Carrier Indicator Field (CIF) in Downlink Control Information (DCI) to indicate an index of a carrier that is scheduled; and the cross-subband scheduling also requires an addition of a subband indicator field in the DCI to indicate an index of a subband that is scheduled.

In the NR system, different carriers normally use different numerologies, even different subbands within a same carrier also normally use different numerologies, that is, different subbands or carriers have their own corresponding numerologies respectively.

Different numerologies can be applied to different application scenarios, such as a subcarrier spacing of 15 kHz can be applied to an Enhanced Mobile BroadBand (eMBB) application, and a subcarrier spacing of 60 kHz can be applied to a Ultra Reliable and Low Latency Communication (URLLC) application.

A numerology may include a subcarrier spacing (SCS) and a cyclic prefix (CP) length. A symbol duration is a summation of a reciprocal of the SCS and the CP length, therefore different numerologies may result in different symbol durations, and the greater a subcarrier spacing is, the shorter a corresponding symbol duration is. In some scenarios, the CP length may vary with the subcarrier spacing, for example, when the subcarrier spacing is increased to m times of an original subcarrier spacing, the CP length is correspondingly reduced to 1/m of its original CP length, and the symbol duration is reduced to 1/m of its original symbol duration, where m is an integer greater than 1.

In some embodiments, for two numerologies, if a first numerology has a subcarrier spacing of 15 kHz and a symbol duration of x microseconds, a second numerology has a subcarrier spacing of M*15 kHz and a symbol duration of x/M microseconds. When two first start symbol boundaries of the two numerologies are the same, a symbol duration of the first numerology is equal to M symbol durations of the second numerology, and two first end symbol boundaries of the two numerologies are the same, the two numerologies are referred to as "symbol boundary alignment".

In the cross-subband or cross-carrier scheduling, if numerologies of the scheduled subbands or carriers are different (especially when symbol durations of the scheduled subbands or carriers are different), a scheduling timing will need to be adjusted due to the difference in the symbol durations.

A cross-subband or cross-carrier scheduling method is provided according to an embodiment of the present disclosure. A base station schedules a user equipment from a first subband or carrier to a second subband or carrier. In the NR system, since a single carrier may have a maximum bandwidth of 80 MHz, then a single carrier may be divided into four subbands, and each of the four subbands has a bandwidth of 20 MHz. If a carrier has a bandwidth of 20 MHz, then it does not need to divide the carrier into several subbands. Assuming that a A carrier and a B carrier have a bandwidth of 20 MHz, a C carrier and a D carrier have a bandwidth of 80 MHz, the C carrier is divided into four subbands of C1, C2, C3 and C4, and the D carrier is divided into four subbands of D1, D2, D3 and D4, then the cross-subband or cross-carrier scheduling may include multiple conditions, for example, the user equipment being scheduled by the base station from the A carrier to the B carrier, or from the A carrier to the C1 subband, or from the C1 subband to the C2 subband, from the C1 subband to the D1 subband, or from the C1 subband to the B carrier and so on.

FIG. 1 schematically illustrates a flow chart of a cross-subband or cross-carrier scheduling method at a base station side according to an embodiment of the present disclosure. The cross-subband or cross-carrier scheduling method may include steps S11 and S12.

In S11, the base station determines a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier.

In S12, the base station transmits downlink control information to the user equipment on the first subband or the first carrier, so that the user equipment can transmit and receive data using the time-frequency resource on the second subband or the second carrier according to the downlink control information, where the downlink control information includes an identification number of the second subband or the second carrier allocated for the user equipment and the first start symbol and the first end symbol for scheduling the user equipment to transmit and receive data using the time-frequency resource on the second subband or the second carrier.

In some embodiments, the downlink control information may further include a scheduling indication for indicating the user equipment to detect scheduling information after a predetermined time.

In some embodiments, determining the first start symbol for scheduling the user equipment to transmit and receive data using the time-frequency resource on the second subband or the second carrier, based on the first numerology corresponding to the first subband or the first carrier and the second numerology corresponding to the second subband or the second carrier, may include the following two ways.

In a first way, a symbol of the second numerology closest to a second end symbol of a downlink control channel of the first numerology is determined as the first start symbol.

In a second way, a second start symbol of a $k1^{th}$ reference slot of the second numerology after a second end symbol of a downlink control channel of the first numerology is determined as the first start symbol, where k1 is an integer greater than or equal to 1, and may be identified by the downlink control information. Where the reference slot may be predefined as a slot of the first numerology or a slot of the second numerology, or be specified by the base station.

As can be seen from the above, in the first way, the first start symbol can be derived from the second end symbol of the downlink control channel. In the second way, if only k1 is specified, the first start symbol will be derived from the second end symbol of the downlink control channel. Therefore, it only needs to specify k1 (k1=0 corresponding to the first way), the first start symbol can be specified, which may effectively save overhead of the downlink control information on basis of ensuring flexibility.

In some embodiments, the determination of the first end symbol may require using the first numerology corresponding to the first subband or the first carrier, the second numerology corresponding to the second subband or the second carrier and the determined first start symbol simultaneously, which also includes two ways as below.

In a first way, a third end symbol of a slot where the start symbol is located is determined as the first end symbol.

In a second way, a fourth end symbol of a k2$^{th}$ reference slot after a slot where the first start symbol is located is determined as the first end symbol, where k2 is an integer greater than or equal to 1, and identified by the downlink control information. Where the reference slot may be predefined as a slot of the first numerology or a slot of the second numerology, or specified by the base station.

As can be seen from the above, in the first way, the first end symbol can be derived from the third end symbol of the slot where the first start symbol is located. In the second way, if only k2 is specified, the first end symbol can be also derived from the third end symbol of the slot where the first start symbol is located. Therefore, it only needs to specify k2 (k2=0 corresponding to the first way), the first end symbol can be specified, which may effectively save downlink control information overhead on basis of ensuring flexibility.

The two ways for determining the first start symbol and the two ways for determining the first end symbol can be freely combined, and one condition where the first start symbol is determined in the first way and the first end symbol is determined in the first way will be described in the following embodiments. Further, the one condition can be divided into four sub-conditions according to whether symbol boundaries of two numerologies are aligned and a magnitude relationship between subcarrier spacings of the two numerologies.

As shown in FIG. 2A, when symbol boundaries of a first numerology are in alignment with symbol boundaries of a second numerology, the two numerologies have a same start boundary, the first numerology has a subcarrier spacing of 15 kHz and a CP length denoted as CP1, and the second numerology has a subcarrier spacing of 60 kHz and a CP length of ¼*CP1, then a symbol duration of the first numerology is equal to four symbol durations of the second numerology, and an end position of a first symbol of the first numerology is the same as an end position of a fourth symbol of the second numerology.

Assuming that a downlink control channel of the first numerology occupies a first symbol of a slot, a symbol of the second numerology closest to a second end symbol of the downlink control channel of the first numerology may be determined as the first start symbol, that is, the first start symbol is determined in the first way, and specifically S21 is the first start symbol as shown in FIG. 2A; and a third end symbol of a slot where the first start symbol is located can be determined as the first end symbol, that is, the first end symbol is determined in the first way, and specifically a symbol S22 shown in FIG. 2A is assumed as a third end symbol of a slot where the first start symbol S21 is located, then S22 is the first end symbol.

Figure 2B:
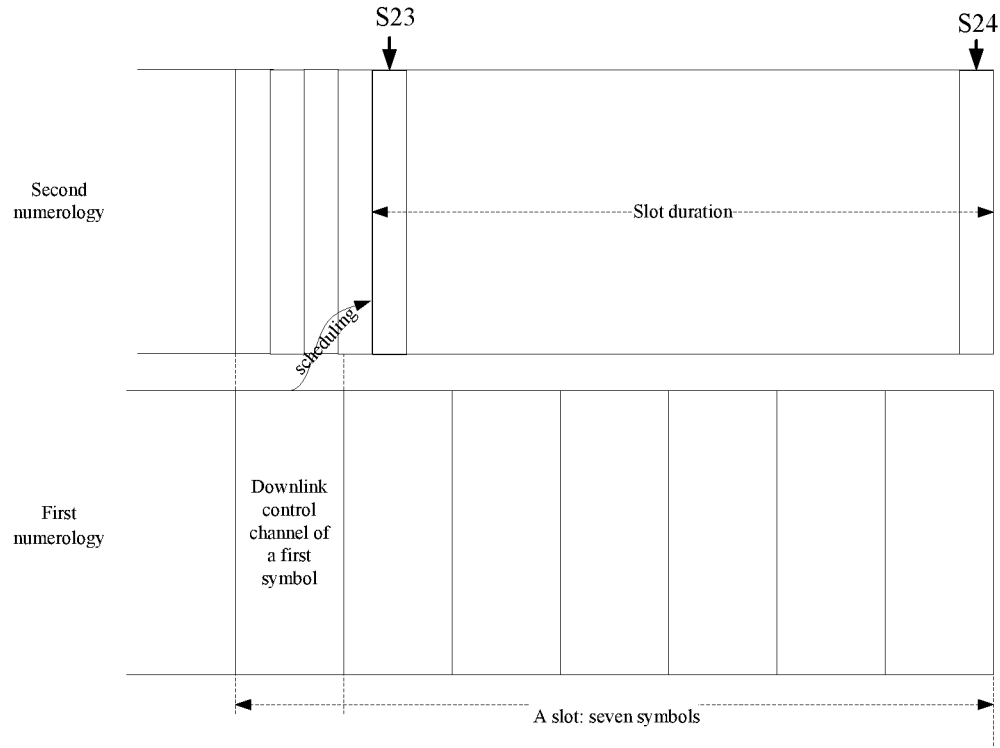

As shown in FIG. 2B, a symbol boundary of a first numerology is not aligned with a symbol boundary of a second numerology, two start boundaries of the two numerologies are the same, the first numerology has a subcarrier spacing of 15 kHz and a CP length denoted as CP1, the second numerology has a subcarrier spacing of 60 kHz and a CP length of ¼*CP2, where CP1 is less than CP2, therefore the first numerology has a symbol duration less than four symbol durations of the second numerology.

Assuming that a downlink control channel of the first numerology occupies a first symbol of a slot, a symbol of the second numerology closest to a second end symbol of the downlink control channel of the first numerology may be determined as the first start symbol, that is, the first start symbol is determined in the first way, and specifically S23 is the first start symbol as shown in FIG. 2B; and a third end symbol of a slot where the first start symbol is located can be determined as the first end symbol, that is, the first end symbol is determined in the first way, and specifically a symbol S24 shown in FIG. 2B is assumed as a third end symbol of a slot where the first start symbol S23 is located, then S24 is the first end symbol.

Figure 3A:
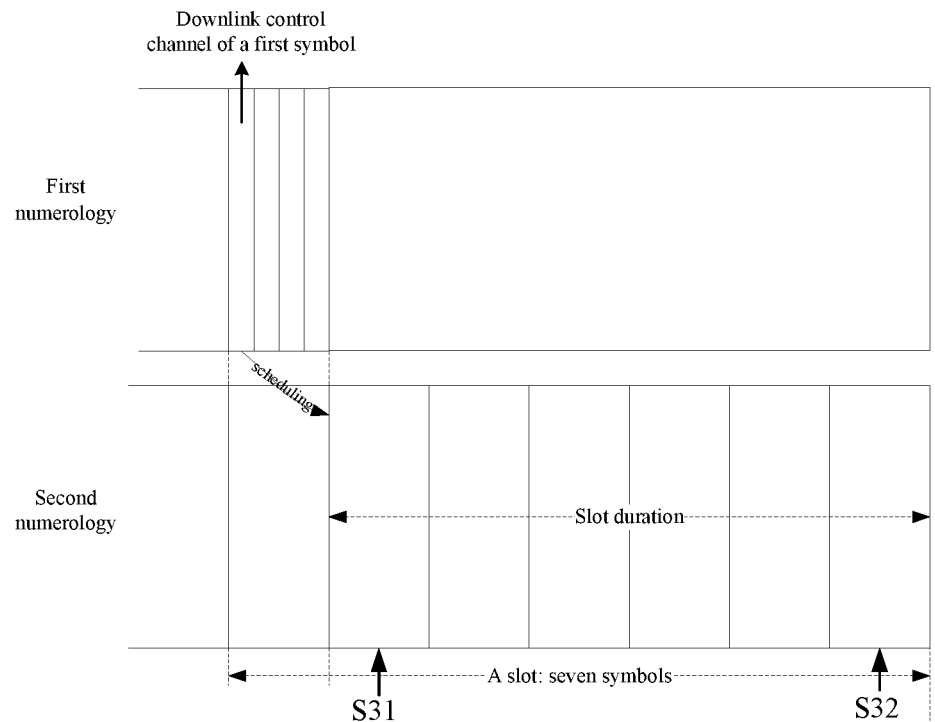
FIG. 3A and FIG. 3B schematically illustrate a method for determining a first start symbol and a first end symbol according to another embodiment of the present disclosure.

As shown in FIG. 3A, symbol boundaries of a first numerology are aligned with symbol boundaries of a second numerology, the two numerologies have a same start boundary, the first numerology has a subcarrier spacing of 60 kHz and a CP length of ¼*CP1, and the second numerology has a subcarrier spacing of 15 kHz and a CP length of CP1, then four symbol durations of the first numerology are equal to one symbol duration of the second numerology, and an end position of a fourth symbol of the first numerology is the same as an end position of a first symbol of the second numerology.

Assuming that a downlink control channel of the first numerology occupies a first symbol of a slot, a symbol of the second numerology closest to a second end symbol of the downlink control channel of the first numerology may be determined as the first start symbol, that is, the first start symbol is determined in the first way, and S31 shown in FIG. 3A is the first start symbol. A third end symbol of a slot where the first start symbol is located may be determined as the first end symbol, that is, the first end symbol is determined in the first way, and S32 shown in FIG. 3A is a third end symbol of a slot where the first start symbol S31 is located, thus S32 is the first end symbol.

Figure 3B:
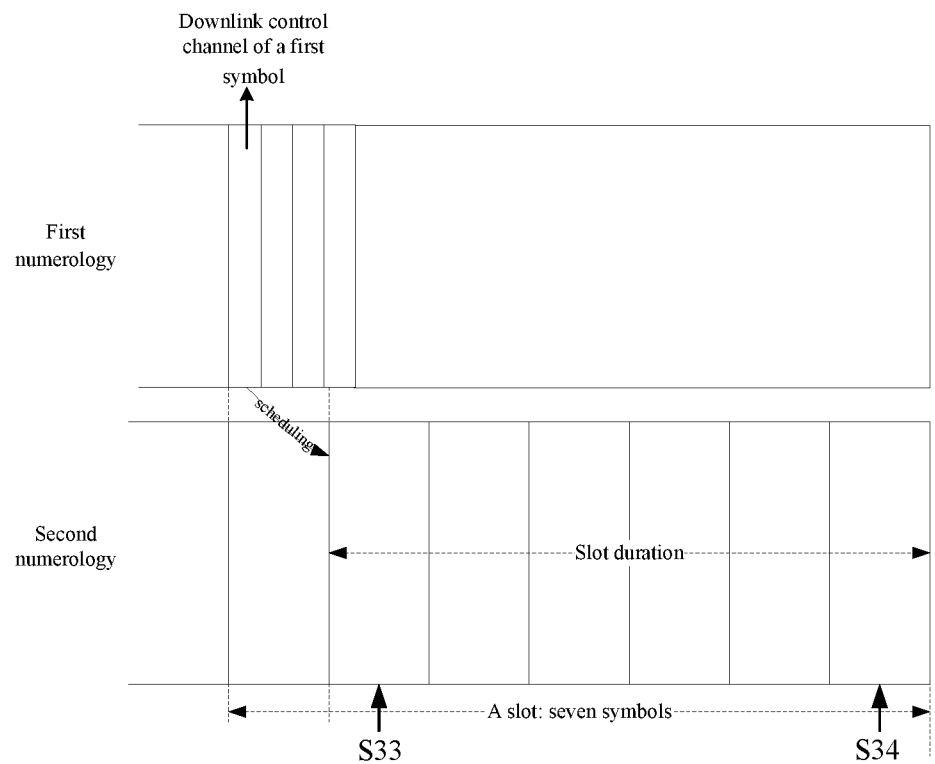

As shown in FIG. 3B, a symbol boundary of a first numerology is not aligned with a symbol boundary of a second numerology, the two numerologies have a same start boundary, the first numerology has a subcarrier spacing of 60 kHz and a CP length of ¼*CP2, the second numerology has a subcarrier spacing of 15 kHz and a CP length of CP1, where CP1 is less than CP2, therefore a symbol duration of the second numerology is less than four symbol durations of the first numerology.

Assuming that a downlink control channel of the first numerology occupies a first symbol of a slot, a symbol of the second numerology closest to a second end symbol of the downlink control channel of the first numerology may be determined as the first start symbol, that is, the first start symbol is determined in the first way, and specifically S33 shown in FIG. 3B is the first start symbol. A third end symbol of a slot where the first start symbol is located may be determined as the first end symbol, that is, the first end symbol is determined in the first way, and S34 shown in FIG. 3B is a third end symbol of a slot where the first start symbol S33 is located, thus S34 is the first end symbol.

Another condition where the first start symbol is determined in the second way, and the first end symbol is determined in the first way will be described below according to some embodiments of the present disclosure.

Figure 4A:
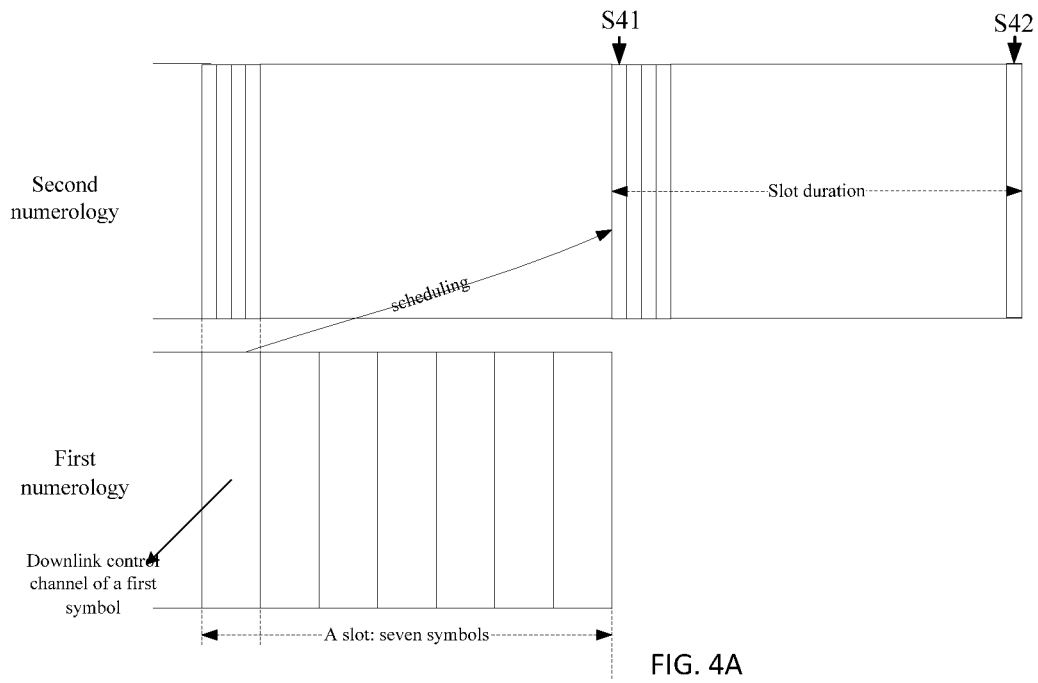
FIG. 4A and FIG. 4B schematically illustrate a method for determining a first start symbol and a first end symbol according to another embodiment of the present disclosure.

As shown in FIG. 4A, symbol boundaries of a first numerology are aligned with symbol boundaries of a second numerology, the two numerologies have a same start boundary, the first numerology has a subcarrier spacing of 15 kHz and a CP length denoted as CP1, the second numerology has a subcarrier spacing of 60 kHz and a CP length of ¼*CP1, then one symbol duration of the first numerology is equal to four symbol durations of the second numerology, and an end position of a first symbol of the first numerology is the same as an end position of a fourth symbol of the second numerology.

Assuming that a downlink control channel of the first numerology occupies a first symbol of a slot, a second start symbol of a first reference slot of the second numerology after a second end symbol of the downlink control channel of the first numerology is determined as the first start symbol, that is, the first start symbol is determined in the second way, where k1 is equal to 1, and the reference slot may be predefined as a slot of the second numerology, and specifically S41 shown in FIG. 4A is the first start symbol. A third end symbol of a slot where the first start symbol is located may be determined as the first end symbol, that is, the first end symbol is determined in the first way, and specifically S42 shown in FIG. 4A is a third end symbol of a slot where the first start symbol S41 is located, thus S42 is the first end symbol.

Figure 4B:
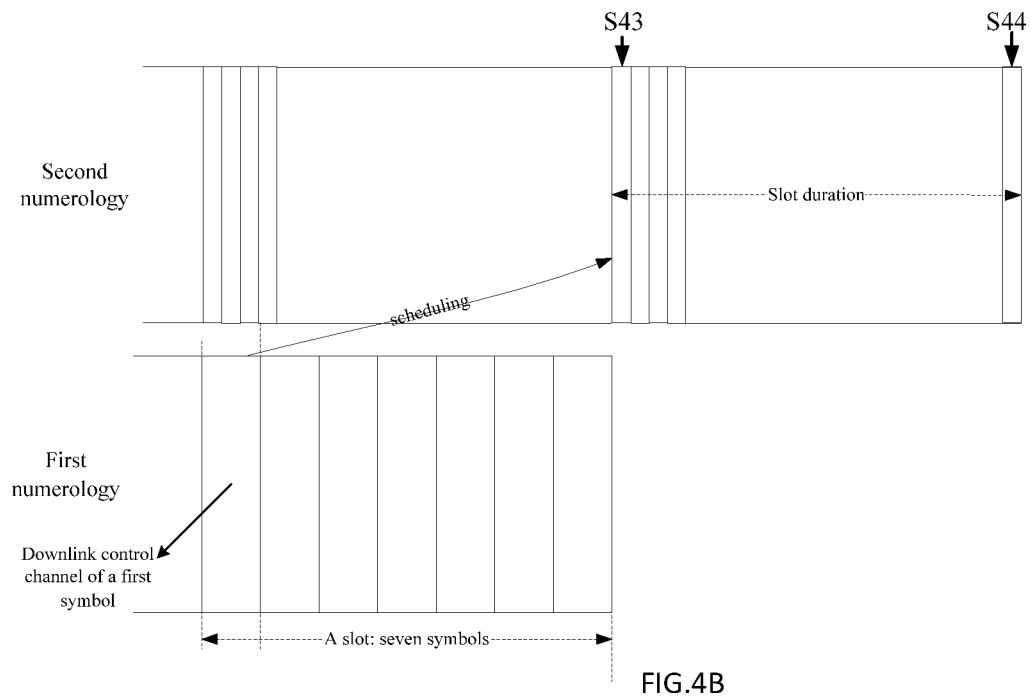

As shown in FIG. 4B, a symbol boundary of a first numerology is not aligned with a symbol boundary of a second numerology, the two numerologies have a same start boundary, the first numerology has a subcarrier spacing of 15 kHz and a CP length denoted as CP1, the second numerology has a subcarrier spacing of 60 kHz and a CP length of ¼*CP2, where CP1 is less than CP2, therefore a symbol duration of the first numerology is less than four symbol durations of the second numerology.

Assuming that a downlink control channel of the first numerology occupies a first symbol of a slot, a second start symbol of a first reference slot of the second numerology after a second end symbol of the downlink control channel of the first numerology is determined as the first start symbol, that is, the first start symbol is determined in the second way, where k1 is equal to 1, and the reference slot may be predefined as a slot of the second numerology, and specifically S43 shown in FIG. 4B is the first start symbol. A third end symbol of a slot where the first start symbol is located may be determined as the first end symbol, that is, the first end symbol is determined in the first way, and specifically S44 shown in FIG. 4B is a third end symbol of a slot where the first start symbol S43 is located, thus S44 is the first end symbol.

Figure 5A:
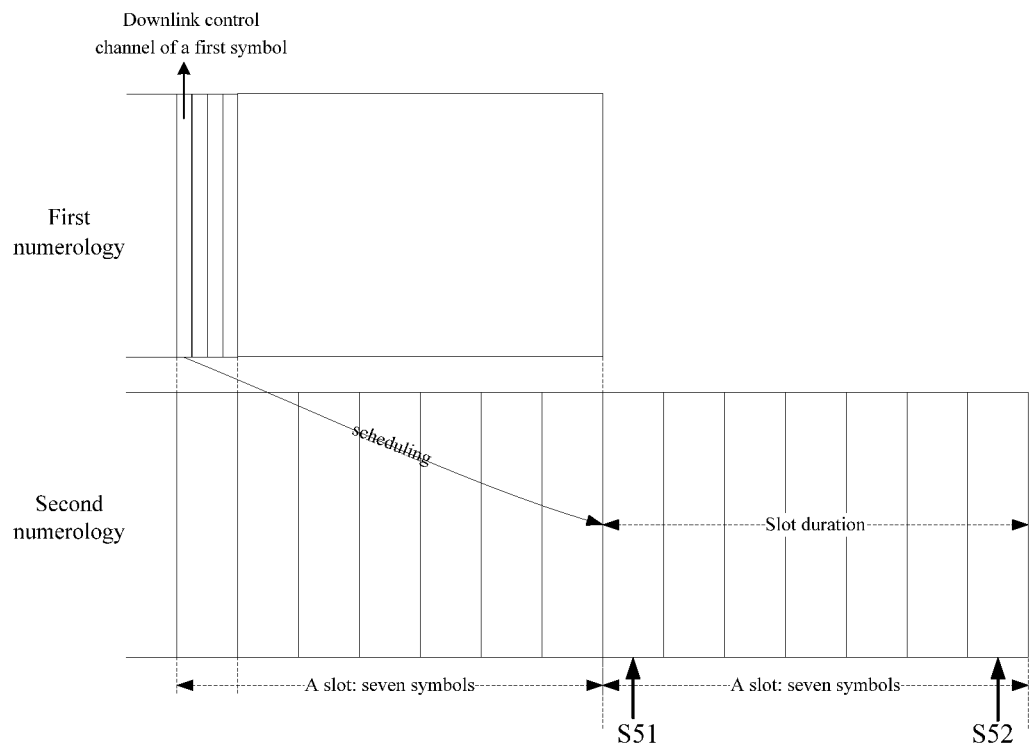
FIG. 5A and FIG. 5B schematically illustrate a method for determining a first start symbol and a first end symbol according to another embodiment of the present disclosure.

As shown in FIG. 5A, symbol boundaries of a first numerology are aligned with symbol boundaries of a second numerology, the two numerologies have a same start boundary, the first numerology has a subcarrier spacing of 60 kHz and a CP length of ¼*CP1, and the second numerology has a subcarrier spacing of 15 kHz and a CP length of CP1, then four symbol durations of the first numerology are equal to one symbol duration of the second numerology, and an end position of a fourth symbol of the first numerology is the same as an end position of a first symbol of the second numerology.

Assuming that a downlink control channel of the first numerology occupies a first symbol of a slot, a second start symbol of a first reference slot of the second numerology after a second end symbol of the downlink control channel of the first numerology is determined as the first start symbol, that is, the first start symbol is determined in the second way, where k1 is equal to 1, and the reference slot may be predefined as a slot of the second numerology, and specifically S51 shown in FIG. 5A is the first start symbol. A third end symbol of a slot where the first start symbol is located may be determined as the first end symbol, that is, the first end symbol is determined in the first way, and specifically S52 shown in FIG. 5A is a third end symbol of a slot where the first start symbol S51 is located, thus S52 is the first end symbol.

Figure 5B:
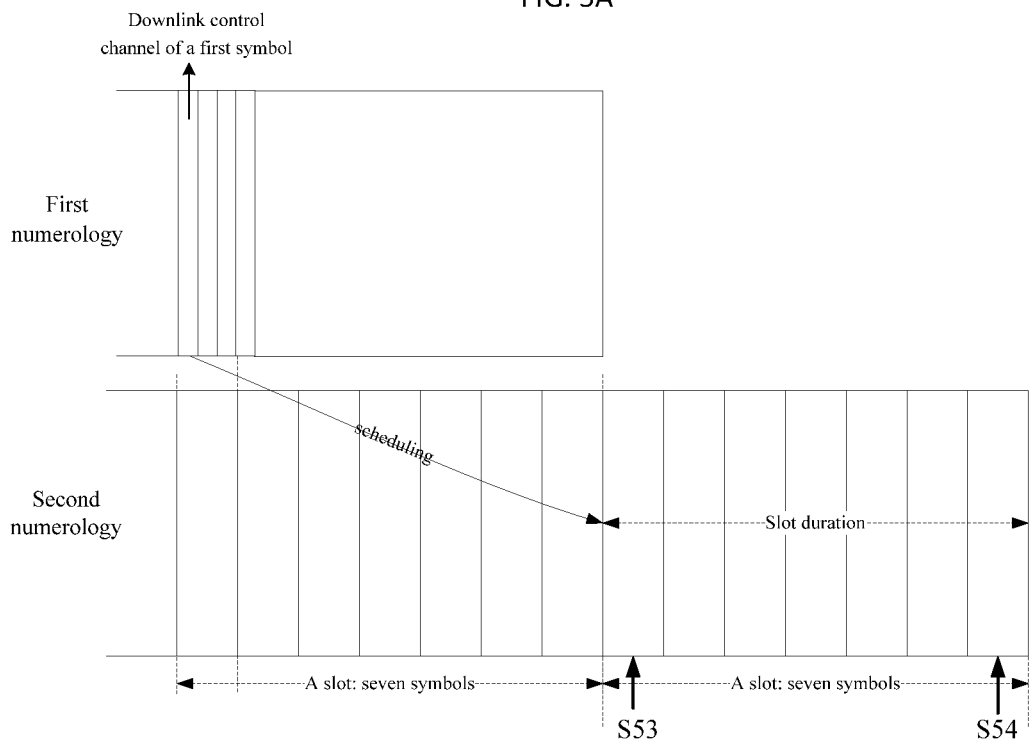

As shown in FIG. 5B, a symbol boundary of a first numerology is not aligned with a symbol boundary of a second numerology, the two numerologies have a same start boundary, the first numerology has a subcarrier spacing of 60 kHz and a CP length denoted as ¼*CP2, the second numerology has a subcarrier spacing of 15 kHz and a CP length of CP1, where CP1 is less than CP2, therefore a symbol duration of the second numerology is less than four symbol durations of the first numerology.

Assuming that a downlink control channel of the first numerology occupies a first symbol of a slot, a second start symbol of a first reference slot of the second numerology after a second end symbol of the downlink control channel of the first numerology is determined as the first start symbol, that is, the first start symbol is determined in the second way, where k1 is equal to 1, and the reference slot may be predefined as a slot of the second numerology, and specifically S53 shown in FIG. 5B is the first start symbol. A third end symbol of a slot where the first start symbol is located may be determined as the first end symbol, that is, the first end symbol is determined in the first way, and specifically S54 shown in FIG. 5B is a third end symbol of a slot where the first start symbol S53 is located, thus S54 is the first end symbol.

The one condition where the first start symbol is determined in the first way and the first end symbol is determined in the first way, and the another condition where the start symbol is determined in the second way and the end symbol is determined in the first way are described in the above embodiments, and other two conditions can be analogously derived.

Figure 6:
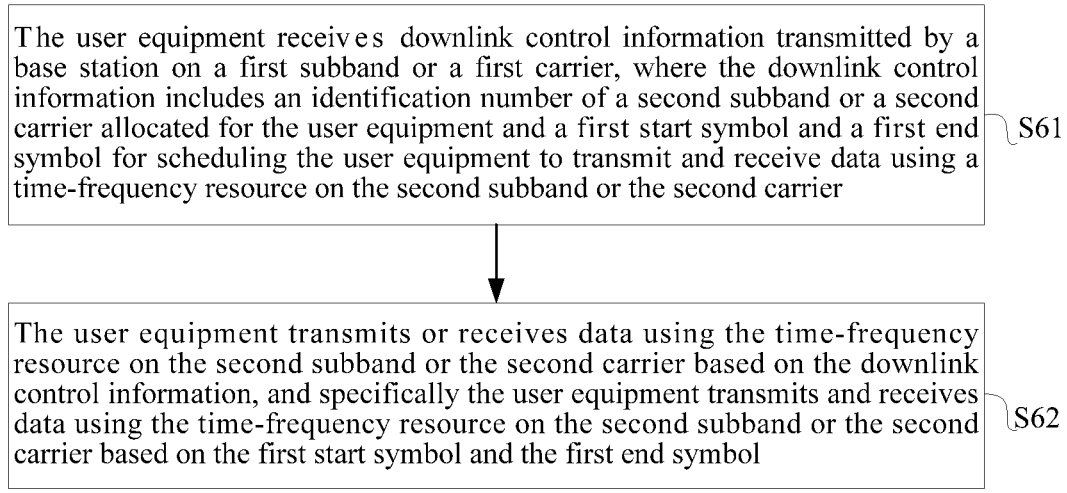
FIG. 6 schematically illustrates a flow chart of a cross-subband or cross-carrier scheduling method at a user equipment side according to an embodiment of the present disclosure.

FIG. 6 schematically illustrates a flow chart of a cross-subband or cross-carrier scheduling method at a user equipment side according to an embodiment of the present disclosure. The cross-subband or cross-carrier scheduling method includes steps S61 and S62.

In S61, the user equipment receives downlink control information transmitted by a base station on a first subband or a first carrier, where the downlink control information includes an identification number of a second subband or a second carrier allocated for a user equipment and a first start symbol and a first end symbol for scheduling the user equipment to transmit and receive data using a time-frequency resource on the second subband or the second carrier.

In S62, the user equipment transmits or receives data data using the time-frequency resource on the second subband or the second carrier based on the downlink control information. Specifically, the user equipment transmits and receives data using the time-frequency resource on the second subband or the second carrier based on the first start symbol and the first end symbol.

In some embodiments, the downlink control information includes a scheduling indication for indicating the user equipment to detect scheduling information after a predetermined time.

According to the cross-subband or cross-carrier scheduling method in the present disclosure, the base station is configured to determine the first start symbol and the first end symbol for scheduling the user equipment to transmit and receive data using the time-frequency resource on the second subband or the second carrier, based on the first numerology corresponding to the first subband or the first carrier and the second numerology corresponding to the second subband or the second carrier, and transmit the first start symbol and the first end symbol to the user equipment on the first subband or the first carrier through the downlink control information, then the user equipment is configured to transmit or receive data using the time-frequency resource on the second subband or the second carrier based on the first start symbol and the first end symbol, so that the cross-subband or cross-carrier scheduling can be realized in the NR system.

The user equipment may receive the downlink control information simultaneously on the first subband or the first carrier and the second subband or the second carrier and obtain the scheduling information. If the user equipment receives the scheduling information on the second subband or the second carrier, the user equipment will use the time frequency resource in accordance with the scheduling information on the second subband or the second carrier and ignore the scheduling information received on the first subband or the first carrier.

Figure 7:
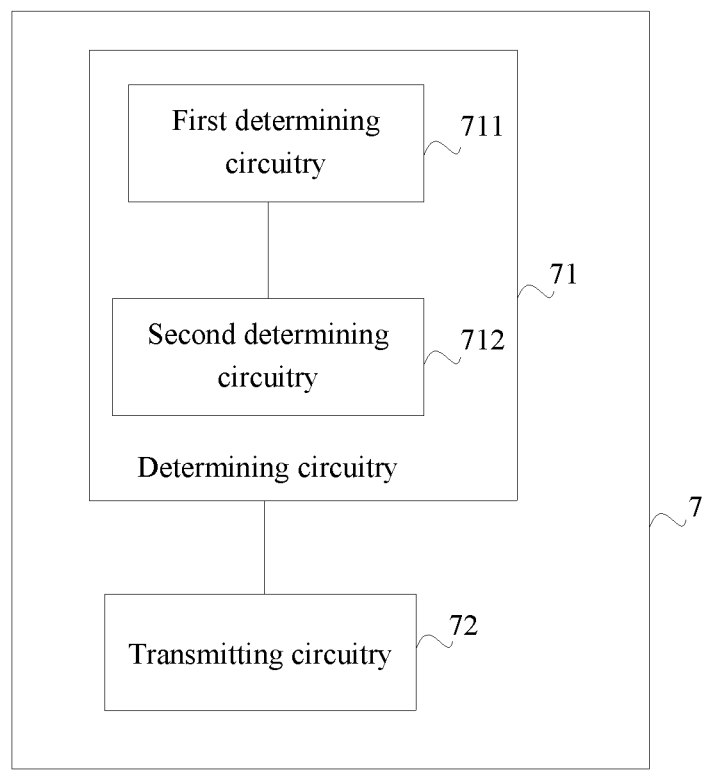
FIG. 7 schematically illustrates a structural diagram of a base station according to an embodiment of the present disclosure.

FIG. 7 schematically illustrates a structural diagram of a base station according to an embodiment of the present disclosure. The base station 7 includes a determining circuitry and a transmitting circuitry.

The determining circuitry 71 is configured to determine a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier.

The transmitting circuitry 72 is configured to transmit downlink control information to the user equipment on the first subband or the first carrier, so that the user equipment can transmit and receive data using the time-frequency resource on the second subband or the second carrier according to the downlink control information. Where the downlink control information includes an identification number of the second subband or the second carrier allocated for the user equipment and the start symbol and the first end symbol determined by the determining circuitry 71 for scheduling the user equipment to transmit and receive data using the time-frequency resource on the second subband or the second carrier.

In some embodiments, the determining circuitry 71 may include a first determining circuitry 711, configured to determine a symbol of the second numerology closest to a second end symbol of a downlink control channel of the first numerology as the start symbol, or determine a second start symbol of a $k1^{th}$ reference slot of the second numerology after the second end symbol of the downlink control channel of the first numerology as the first start symbol, where k1 is an integer greater than or equal to 1, and identified by the downlink control information. Where the reference slot may be a slot defined by the first numerology corresponding to the first subband or the first carrier, or a slot defined by the second numerology corresponding to the second subband or the second carrier.

In some embodiments, the determining circuitry 71 may further include a second determining circuitry 712, configured to determine a third end symbol of a slot where the first start symbol is located as the first end symbol, or determine a fourth end symbol of a $k2^{th}$ reference slot after the slot where the first start symbol is located as the first end symbol, where k2 is an integer greater than or equal to 1, and identified by the downlink control information. Where the reference slot may be a slot defined by the first numerology corresponding to the first subband or the first carrier, or a slot defined by the second numerology corresponding to the second subband or the second carrier.

In some embodiments, the downlink control information further includes a scheduling indication for indicating the user equipment to detect scheduling information after a predetermined time.

The base station according to embodiments of the present disclosure can determine the first start symbol and the first end symbol for scheduling the user equipment to transmit and receive data using the time-frequency resource on the second subband or the second carrier, based on the first numerology corresponding to the first subband or the first carrier and the second numerology corresponding to the second subband or the second carrier, and transmit the first start symbol and the first end symbol to the user equipment on the first subband or the first carrier through the downlink control information, so that the user equipment can transmit or receive data using the time-frequency resource on the second subband or the second carrier based on the downlink control information.

Figure 8:
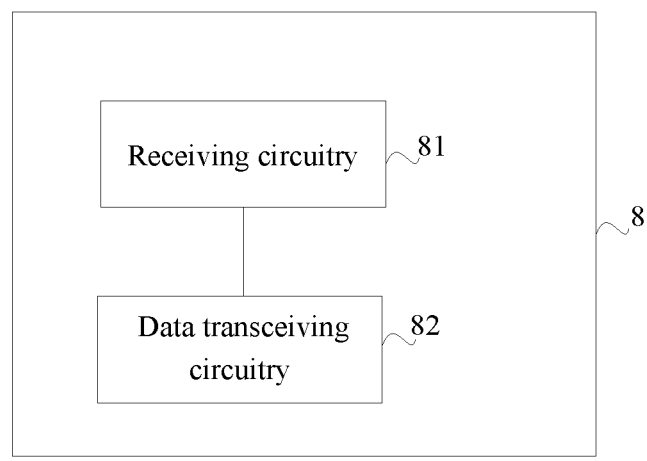
FIG. 8 schematically illustrates a structural diagram of a user equipment according to an embodiment of the present disclosure.

FIG. 8 schematically illustrates a structural diagram of a user equipment according to an embodiment of the present disclosure. The user equipment may include a receiving circuitry 81 and a data transceiving circuitry 82.

The receiving circuitry 81 is configured to receive downlink control information transmitted by a base station on a first subband or a first carrier, where the downlink control information includes an identification number of a second subband or a second carrier allocated for a user equipment and a first start symbol and a first end symbol for scheduling the user equipment to transmit and receive data using a time-frequency resource on the second subband or the second carrier.

The data transceiving circuitry 82 is configured to transmit or receive data using the time-frequency resource on the second subband or the second carrier based on the downlink control information received by the receiving circuitry 81.

In some embodiments, the data transceiving circuitry 82 is configured to transmit or receive data using the time-frequency resource on the second subband or the second carrier based on the first start symbol and the first end symbol.

In some embodiments, the downlink control information includes a scheduling indication for indicating the user equipment to detect scheduling information after a predetermined time.

The user equipment according to embodiments of the present disclosure can receive the downlink control information transmitted by the base station on the first subband or the first carrier, and transmit or receive data using the time-frequency resource on the second subband or the second carrier based on the downlink control information.

It will be understood by those of ordinary skill in the art that implementing all or part of the processes in the method of the embodiments described above may be accomplished by means of a computer program to be commanded by the associated hardware, which may be stored in a computer-readable storage medium, At the time of execution, a flow of an embodiment as described above may be included. The storage medium may be a magnetic disk, an optical disk, a read-only memory (ROM), a random access memory (RAM), or the like.

The method and system of the embodiment of the present disclosure have been described in detail hereinabove, but the scope of the present disclosure is not limited thereto. It will be apparent to those skilled in the art that various changes and modifications may be made without departing from the spirit and scope of the invention, and therefore, the scope of the invention should be determined by the scope of the claims.

The invention claimed is:

1. A cross-subband or cross-carrier scheduling method, comprising:
    determining a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier; and
    transmitting downlink control information to the user equipment on the first subband or the first carrier, so that the user equipment can transmit and receive data using the time-frequency resource on the second subband or the second carrier according to the downlink control information, where the downlink control information comprises an identification number of the second subband or the second carrier allocated for the user equipment and the first start symbol and the first end symbol for scheduling the user equipment to transmit and receive data using the time-frequency resource on the second subband or the second carrier.

2. The method according to claim 1, wherein determining the first start symbol for scheduling the user equipment to transmit and receive data using the time-frequency resource on the second subband or the second carrier, based on the first numerology corresponding to the first subband or the first carrier and the second numerology corresponding to the second subband or the second carrier comprises:
    determining a symbol of the second numerology closest to a second end symbol of a downlink control channel of the first numerology as the first start symbol, or determining a second start symbol of a $k1^{th}$ reference slot of the second numerology after the second end symbol of the downlink control channel of the first numerology as the first start symbol, where k1 is an integer greater than or equal to 1, and identified by the downlink control information.

3. The method according to claim 2, wherein determining the first end symbol for scheduling the user equipment to transmit and receive data using the time-frequency resource on the second subband or the second carrier, based on the first numerology corresponding to the first subband or the first carrier and the second numerology corresponding to the second subband or the second carrier comprises:
    determining a third end symbol of a slot where the first start symbol is located as the first end symbol, or determining a fourth end symbol of a $k2^{th}$ reference slot after the slot where the first start symbol is located as the first end symbol, where k2 is an integer greater than or equal to 1, and identified by the downlink control information.

4. The method according to claim 2, wherein the reference slot is a slot defined by the first numerology corresponding to the first subband or the first carrier, or a slot defined by the second numerology corresponding to the second subband or the second carrier.

5. The method according to claim 3, wherein the reference slot is a slot defined by the first numerology corresponding to the first subband or the first carrier, or a slot defined by the second numerology corresponding to the second subband or the second carrier.

6. The method according to claim 1, wherein the downlink control information further comprises a scheduling indication for indicating the user equipment to detect scheduling information after a predetermined time.

7. The method according to claim 1, wherein each of the first numerology and the second numerology comprises a subcarrier spacing and a cyclic prefix length.

8. A cross-subband or cross-carrier scheduling method, comprising:
    receiving downlink control information transmitted by a base station on a first subband or a first carrier, where the downlink control information comprises an identification number of a second subband or a second carrier allocated for a user equipment and a first start symbol and a first end symbol for scheduling the user equipment to transmit and receive data using a time-frequency resource on the second subband or the second carrier, wherein the downlink control information further comprises a scheduling indication for indicating the user equipment to detect scheduling information after a predetermined time; and
    transmitting or receiving data using the time-frequency resource on the second subband or the second carrier based on the downlink control information.

9. The method according to claim 8, wherein transmitting or receiving data using the time-frequency resource on the second subband or the second carrier based on the downlink control information comprises: transmitting and receiving data using the time-frequency resource on the second subband or the second carrier based on the start symbol and the end symbol.

10. A base station, comprising:
    a determining circuitry, configured to determine a first start symbol and a first end symbol for scheduling a user equipment to transmit and receive data using a time-frequency resource on a second subband or a second carrier, based on a first numerology corresponding to a first subband or a first carrier and a second numerology corresponding to the second subband or the second carrier; and
    a transmitting circuitry, configured to transmit downlink control information to the user equipment on the first subband or the first carrier, so that the user equipment can transmit and receive data using the time-frequency resource on the second subband or the second carrier according to the downlink control information, where the downlink control information comprises an identification number of the second subband or the second carrier allocated for the user equipment and the start symbol and the first end symbol determined by the determining circuitry for scheduling the user equipment to transmit and receive data using the time-frequency resource on the second subband or the second carrier.

11. The base station according to claim 10, wherein the determining circuitry comprises:
    a first determining circuitry, configured to determine a symbol of the second numerology closest to a second end symbol of a downlink control channel of the first numerology as the start symbol, or determine a second start symbol of a $k1^{th}$ reference slot of the second numerology after the second end symbol of the downlink control channel of the first numerology as the first start symbol, where k1 is an integer greater than or equal to 1, and identified by the downlink control information.

12. The base station according to claim 11, wherein the determining circuitry further comprises:
 a second determining circuitry, configured to determine a third end symbol of a slot where the first start symbol is located as the first end symbol, or determine a fourth end symbol of a k2$^{th}$ reference slot after the slot where the first start symbol is located as the first end symbol, where k2 is an integer greater than or equal to 1, and identified by the downlink control information.

13. The base station according to claim 11, wherein the reference slot is a slot defined by the first numerology corresponding to the first subband or the first carrier, or a slot defined by the second numerology corresponding to the second subband or the second carrier.

14. The base station according to claim 12, wherein the reference slot is a slot defined by the first numerology corresponding to the first subband or the first carrier, or a slot defined by the second numerology corresponding to the second subband or the second carrier.

15. The base station according to claim 10, wherein the downlink control information further comprises a scheduling indication for indicating the user equipment to detect scheduling information after a predetermined time.

16. The base station according to claim 10, wherein each of the first numerology and the second numerology comprises a subcarrier spacing and a cyclic prefix length.

17. A user equipment, further comprising:
 a receiving circuitry, configured to receive downlink control information transmitted by a base station on a first subband or a first carrier, where the downlink control information comprises an identification number of a second subband or a second carrier allocated for a user equipment and a first start symbol and a first end symbol for scheduling the user equipment to transmit and receive data using a time-frequency resource on the second subband or the second carrier, wherein the downlink control information further comprises a scheduling indication for indicating the user equipment to detect scheduling information after a predetermined time; and
 a data transceiving circuitry, configured to transmit or receive data using the time-frequency resource on the second subband or the second carrier based on the downlink control information received by the receiving circuitry.

18. The user equipment according to claim 17, wherein the data transceiving circuitry is configured to transmit or receive data using the time-frequency resource on the second subband or the second carrier based on the first start symbol and the first end symbol.

\* \* \* \* \*